(12) United States Patent
Abdel-Fattah et al.

(10) Patent No.: US 12,365,827 B2
(45) Date of Patent: Jul. 22, 2025

(54) MULTICOMPONENT NANOCAPSULES FOR ENHANCED OIL RECOVERY

(71) Applicant: SAUDI ARABIAN OIL COMPANY, Dhahran (SA)

(72) Inventors: Amr Ismail Abdel-Fattah, Dhahran (SA); Ahmed Wasel Alsmaeil, Dhahran (SA); Afnan Mashat, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/192,251

(22) Filed: Mar. 29, 2023

(65) Prior Publication Data

US 2023/0227713 A1     Jul. 20, 2023

Related U.S. Application Data

(62) Division of application No. 17/350,158, filed on Jun. 17, 2021, now Pat. No. 11,674,075.

(51) Int. Cl.

| | |
|---|---|
| *E21B 43/16* | (2006.01) |
| *C09K 8/60* | (2006.01) |
| *C09K 8/64* | (2006.01) |
| *C09K 8/68* | (2006.01) |
| *C09K 8/70* | (2006.01) |
| *B82Y 30/00* | (2011.01) |

(52) U.S. Cl.
CPC ............ *C09K 8/706* (2013.01); *C09K 8/604* (2013.01); *C09K 8/64* (2013.01); *C09K 8/68* (2013.01); *E21B 43/16* (2013.01); *B82Y 30/00* (2013.01); *C09K 2208/10* (2013.01)

(58) Field of Classification Search
CPC .......... C09K 8/706; C09K 8/604; C09K 8/68; E21B 43/16; B82Y 30/00
See application file for complete search history.

(56) References Cited

U.S. PATENT DOCUMENTS

| | | | |
|---|---|---|---|
| 10,954,427 B2 * | 3/2021 | Kalgaonkar | C09K 8/487 |
| 11,078,394 B2 * | 8/2021 | Ellis | C09K 8/08 |
| 11,155,749 B1 * | 10/2021 | Favero | E21B 43/20 |
| 2016/0017204 A1 | 1/2016 | Hill et al. | |
| 2018/0346797 A1 | 12/2018 | Kalgaonkar et al. | |
| 2018/0346798 A1 | 12/2018 | Abdel-Fattah et al. | |

FOREIGN PATENT DOCUMENTS

| | | | | |
|---|---|---|---|---|
| CA | 3213704 A1 * | 10/2022 | | C09K 8/03 |

* cited by examiner

*Primary Examiner* — Silvana C Runyan
(74) *Attorney, Agent, or Firm* — Osha Bergman Watanabe & Burton LLP

(57) ABSTRACT

A multicomponent nanocapsule composition comprising a core particle, an oil phase encapsulating the core particle, and an aqueous phase in which the encapsulated core particle is suspended is provided. The porous particle includes a cationic surfactant encapsulated in a porous particle. The oil phase includes an anionic surfactant and a zwitterionic surfactant. A method of making a multicomponent nanocapsule composition is also provided. A method of treating a hydrocarbon-bearing formation with the multicomponent nanocapsule composition is provided. The method may include providing a multicomponent nanocapsule composition, introducing the multicomponent nanocapsule composition into the hydrocarbon-bearing formation, displacing hydrocarbons from the hydrocarbon-bearing formation by contacting the multicomponent nanocapsule composition with the hydrocarbons, and recovering the hydrocarbons.

10 Claims, 5 Drawing Sheets

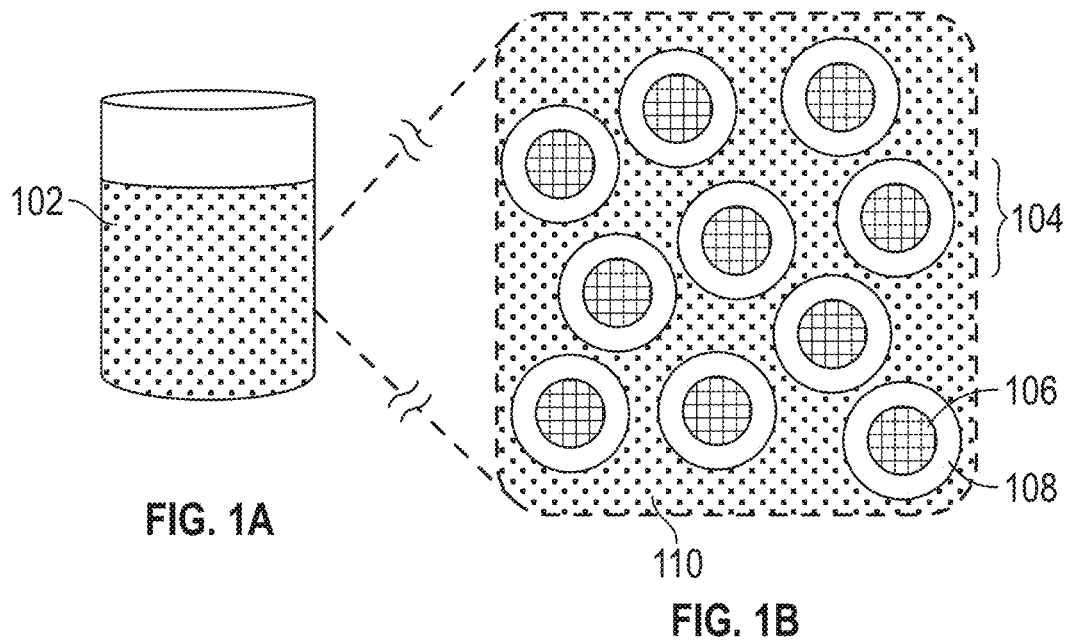
FIG. 1A
FIG. 1B
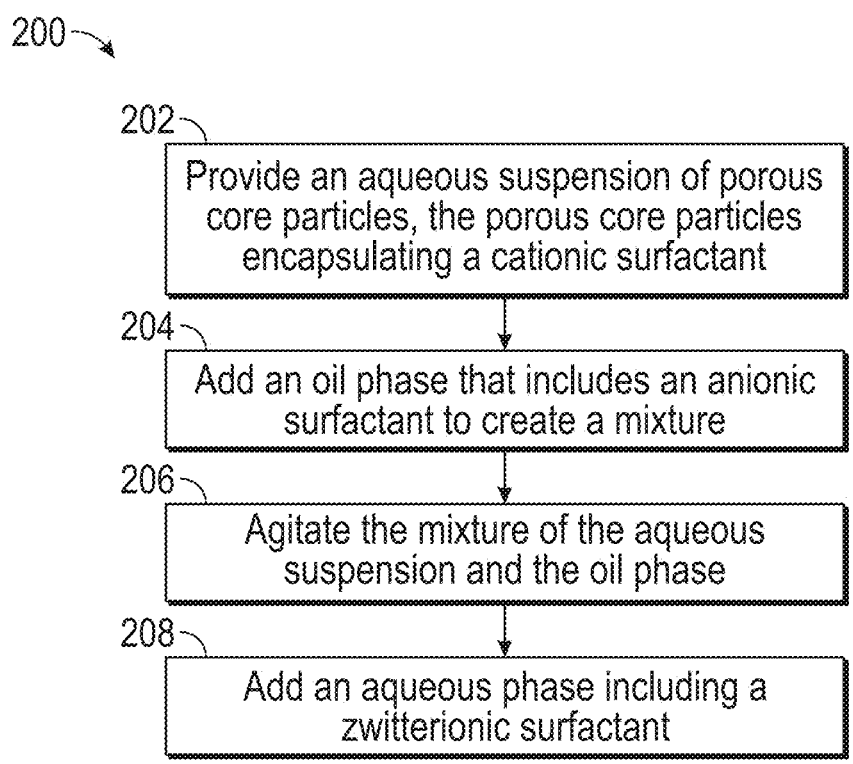
FIG. 2

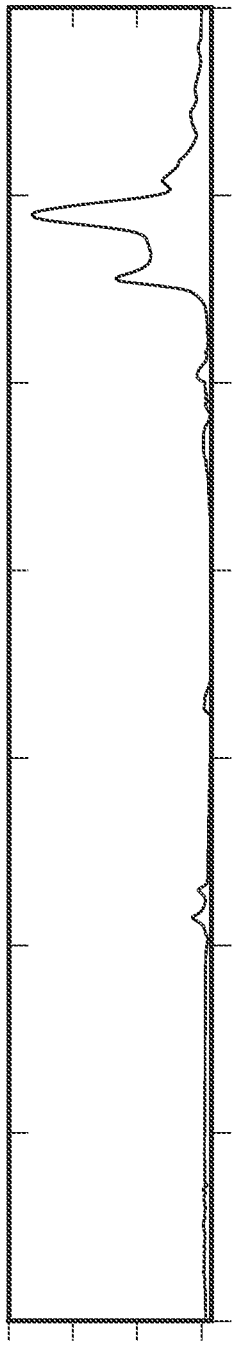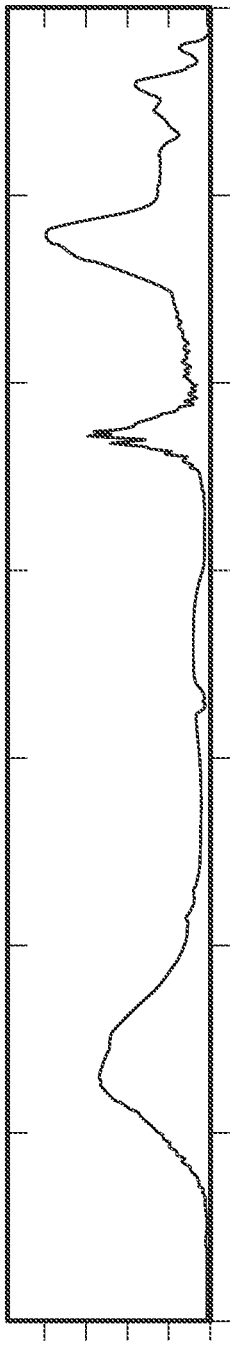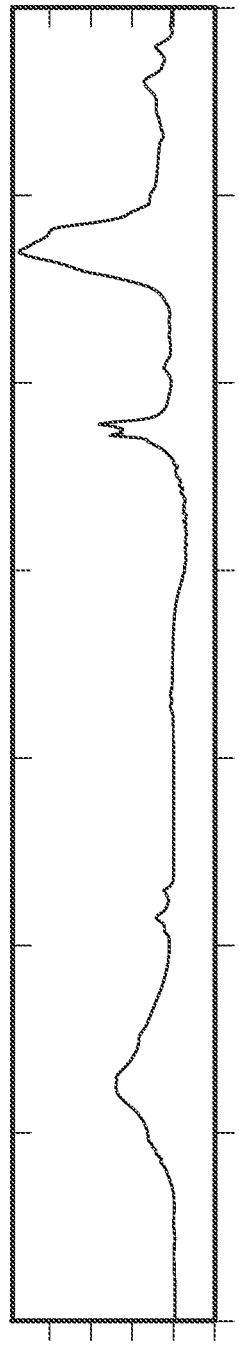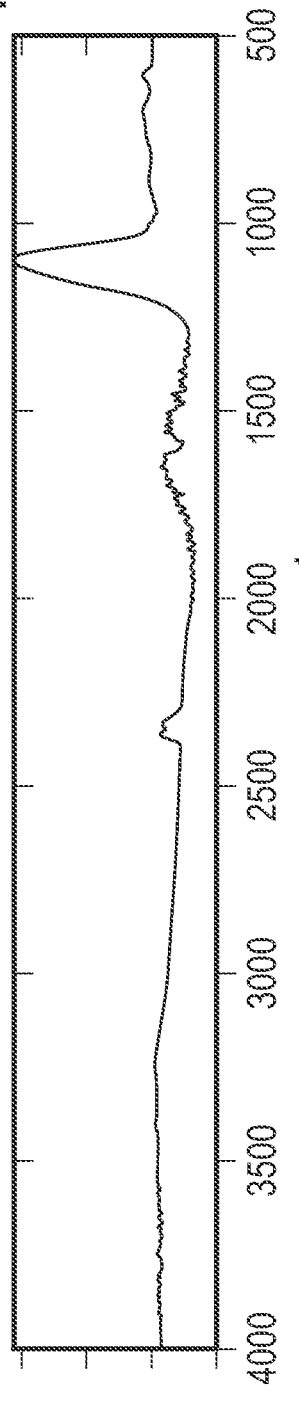
FIG. 4A
FIG. 4B
FIG. 4C
FIG. 4D

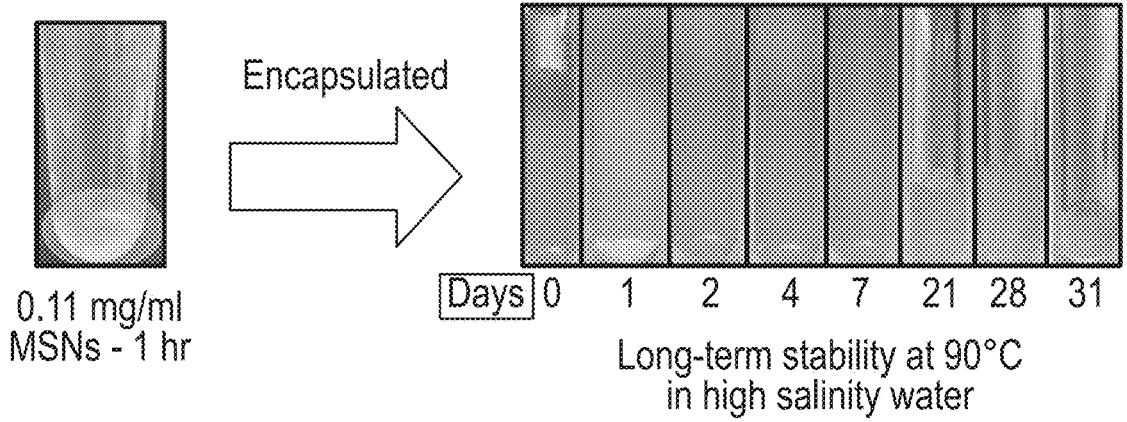
FIG. 5A  FIG. 5B
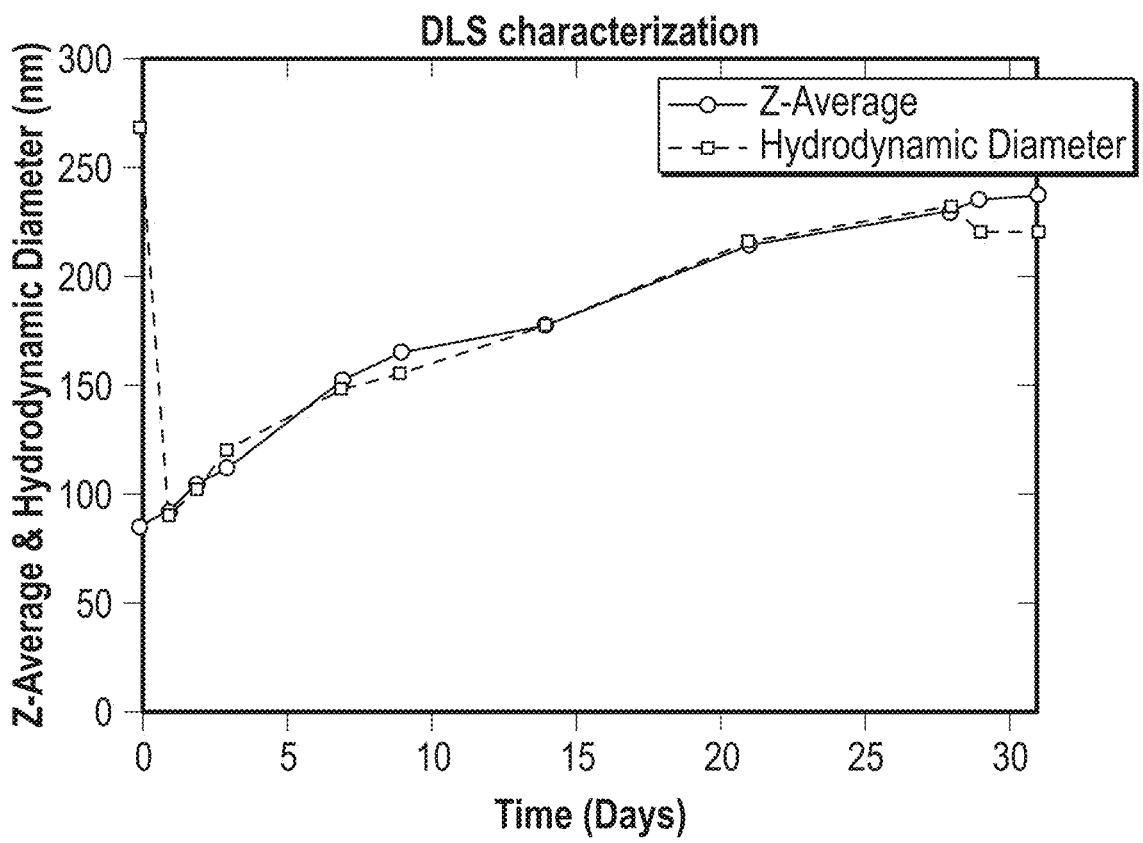
FIG. 6

MULTICOMPONENT NANOCAPSULES FOR ENHANCED OIL RECOVERY

CROSS REFERENCE TO RELATED APPLICATIONS

This application is a divisional of U.S. patent application Ser. No. 17/350,158, filed Jun. 17, 2021, incorporated by reference herein.

BACKGROUND

Enhanced oil recovery (EOR) enables the extraction of hydrocarbon reserves that cannot be accessed by conventional primary and secondary recovery processes, such as gas or water displacement. EOR may involve the use of chemical injection techniques, which can utilize surfactants to lower the interfacial tension between the residual hydrocarbon and the injection fluid, allowing the hydrocarbon to be more readily removed. A challenging aspect of these techniques lies in efficiently delivering the surfactant to the hydrocarbon reserves, which requires avoiding degradation of the surfactant under the, possibly harsh, conditions of the reservoir in addition to limiting near-wellbore adsorption. If near-well absorption is not limited, a tremendous amount of surfactant is required to account for the amount lost before the target hydrocarbons are reached.

Moreover, effective EOR operations greatly benefit from an improved knowledge of the geological formations and the distribution of the hydrocarbon reserves therein. This can be achieved by the implementation of imaging methods, such as through the use of magnetic materials, to probe the structure of a reservoir. However, magnetic materials (such as iron oxide nanoparticles) and surfactants may have limited stability to the high temperatures and high salinity that may be present in EOR applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a multicomponent nanocapsule (MCNC) composition comprising a core particle, an oil phase encapsulating the core particle, and an aqueous phase in which the encapsulated core particle is suspended. The porous particle includes a cationic surfactant encapsulated in a porous particle. The oil phase includes an anionic surfactant and a zwitterionic surfactant.

In another aspect, embodiments disclosed herein relate to a method of preparing a multicomponent nanocapsule composition. The method includes providing an aqueous suspension of porous core particles encapsulating a cationic surfactant, adding an oil phase comprising an anionic surfactant to the suspension of porous core particles to create a mixture of the aqueous suspension and the oil phase, agitating the mixture of the aqueous suspension and the oil phase, and adding an aqueous phase comprising a zwitterionic surfactant to the mixture to provide the multicomponent nanocapsule composition.

In yet another aspect, embodiments disclosed herein relate to a method of treating a hydrocarbon-bearing formation. The method includes providing a multicomponent nanocapsule composition, introducing the multicomponent nanocapsule composition into the hydrocarbon-bearing formation, displacing hydrocarbons from the hydrocarbon-bearing formation by contacting the multicomponent nanocapsule composition with the hydrocarbons, and recovering the hydrocarbons. In such aspects, the multicomponent nanocapsule composition includes a core particle comprising a cationic surfactant encapsulated in a porous particle, an oil phase encapsulating the core particle, the oil phase comprising an anionic surfactant and a zwitterionic surfactant, and an aqueous phase in which the encapsulated core particle is suspended.

Other aspects and advantages of the claimed subject matter will be apparent from the following description and the appended claims.

BRIEF DESCRIPTION OF DRAWINGS

FIG. 1A is a schematic representation of a multicomponent nanocapsule composition in accordance with one or more embodiments.

FIG. 1B is a schematic representation of a multicomponent nanocapsule composition in accordance with one or more embodiments.

FIG. 2 is a method of making a multicomponent nanocapsule composition in accordance with one or more embodiments.

FIG. 4A is a FTIR data for a composition in accordance with one or more embodiments.

FIG. 4B is a FTIR data for a composition in accordance with one or more embodiments.

FIG. 4C is a FTIR data for a composition in accordance with one or more embodiments.

FIG. 4D is a FTIR data for a composition in accordance with one or more embodiments.

FIG. 5A is a photograph showing the stability of a comparative composition in accordance with one or more embodiments.

FIG. 5B is a photograph showing the stability of a composition in accordance with one or more embodiments.

FIG. 6 is a plot showing the dynamic light scattering data of a composition in accordance with one or more embodiments.

DETAILED DESCRIPTION

Figure 3:
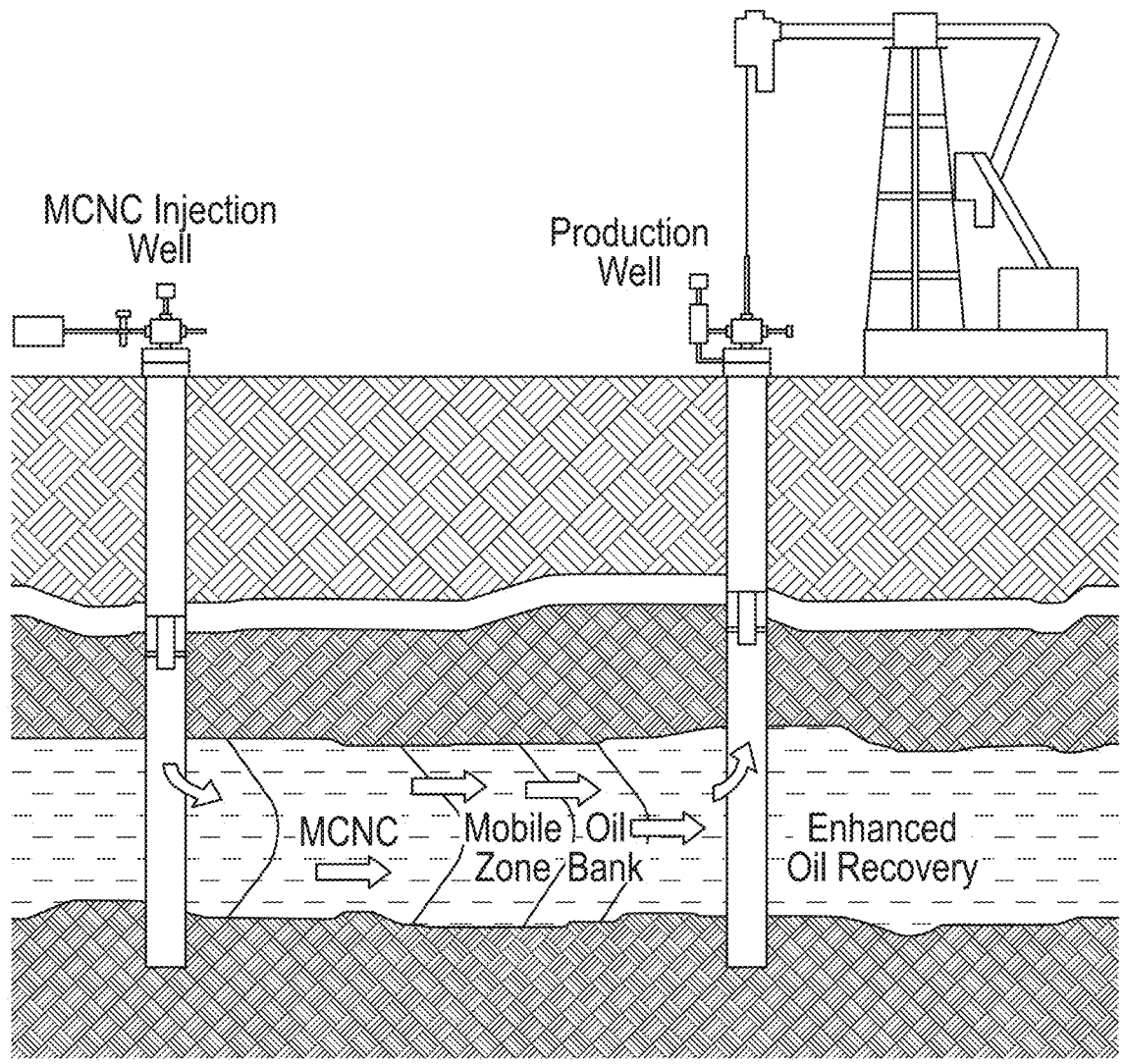
FIG. 3 is a depiction of using a multicomponent nanocapsule composition for enhanced oil recovery in accordance with one or more embodiments.

Embodiments in accordance with the present disclosure generally relate to a multicomponent nanocapsule (MCNC) composition that is stable under harsh reservoir conditions, such as high temperature and high salinity. This stability may be provided in one or more embodiments by the encapsulation of the active ingredients utilizing unique techniques. Method of making and using the compositions in enhanced oil recovery applications are also described.

MCNC Composition

An MCNC composition of one or more embodiments of the present disclosure may be an aqueous suspension that comprises an aqueous phase, an oil phase including two or more surfactants, and porous core particles encapsulating a surfactant. In one or more embodiments, the porous core particle encapsulating the surfactant is further encapsulated by the oil phase including two or more surfactants. The encapsulated core particles are then suspended in the aqueous phase.

A schematic depiction of a composition in accordance with one or more embodiments is shown in FIGS. 1A and 1B. FIG. 1A shows a homogeneous suspension 102 of MCNC in an aqueous fluid. An expanded version of the suspension 102 is shown in FIG. 1B. The suspension includes MCNCs 104 that are composed of a core particle 106 that has a cationic surfactant loaded in its pores. In the embodiment shown in FIG. 1B the pores are all the same size and shape, however, in one or more embodiments, the pores may be irregular in size and/or shape. The core particle is encapsulated by a layer of an oil phase 108. The oil phase may include at least two surfactants (not shown). The MCNCs 104 are suspended in an aqueous fluid 110.

As noted previously, MCNCs in accordance with one or more embodiments of the present disclosure include a porous core particle. The porous core particle may be made of any suitable material such as, for example, porous silica and metal organic frameworks. In particular embodiments, the porous silica may be a mesoporous silica such as MCM-41.

The porous core particle in accordance with one or more embodiments is a particle having pores. As used herein "pores" refer to void spaces in the particle. The void spaces may be filled with other materials, such as surfactants used in enhanced oil recovery applications. In one or more embodiments, the pores may have an average diameter of from about 2 to 50 nm (nanometers). In some embodiments, the pores may be in the shape of extended cylinders.

The porous particles of the present disclosure may be any suitable size for use in enhanced oil recovery applications. In such applications, the particles may be sufficiently small to traverse pores inside a reservoir, which can be as small as 100-200 nm (nanometers). In one or more embodiments, the particles may be nanoparticles, meaning the average particle diameter is less than one micrometer as measured by dynamic light scattering techniques. The average hydrodynamic particle diameter may have a lower limit of one of 25, 50, 100, 125, 150 and 200 nm and an upper limit of one of 225, 250, 275, 300, 350, 500, 750 and 950 nm, where any lower limit may be combined with any mathematically compatible upper limit. In particular embodiments, the average hydrodynamic particle diameter may be from about 50 to 300 nm.

As described previously, the pores of the porous particle may be loaded with a cationic surfactant used in enhanced oil recovery applications. As will be explained in greater detail below, the porous particle may serve as a delivery mechanism for transporting the cationic surfactant into the reservoir so it may penetrate farther than a surfactant that is not encapsulated in a porous particle. The cationic surfactant may be an alkyl ammonium salt, for example. In one or more embodiments, the cationic surfactant may be selected from the group consisting of cetrimonium bromide (CTAB), dimethyldioctadecylammonium chloride, and combinations thereof.

Porous particles in accordance with one or more embodiments of the present disclosure may have a suitable amount of the cationic surfactant loaded into the pores. The amount of cationic surfactant may be adjusted based upon the end use application. In one or more embodiments, a porous particle may include up to 10 wt. %, up to 20 wt. %, up to 30 wt. %, up to 40 wt. %, or up to 50 wt. % of the cationic surfactant based upon the total weight of the porous particle and the cationic surfactant.

In one or more embodiments, and as shown in FIG. 1B, the porous core particle is encapsulated by an oil phase. The oil phase may be configured as a layer of the oil phase encapsulating the porous particle. The oil phase may include at least two surfactants, including an anionic surfactant and a zwitterionic surfactant. The zwitterionic surfactant may also be referred to herein as a "co-surfactant." In one or more embodiments, the oil phase includes an oil component, which, in particular embodiments, may be mineral oil.

The anionic surfactant included in the oil phase may be a sulfonate surfactant in some embodiments. In one or more embodiments, the sulfonate surfactant may be a petroleum sulfonate. Petroleum sulfonates in accordance with the present disclosure may be one or more of the group consisting of alkyl xylene sulfonates, alkyl aryl sulfonates, and alpha-olefin sulfonates. In one or more embodiments, the petroleum sulfonate may be a commercially available product such as PETRONATE™ HL/L sodium sulfonate (Sonneborn LLC, NJ, USA; hereinafter "HL/L"), BIO-SOFT S126 (Stepan Company, Northfield, USA), and Sulfonic 100 alkylbenzene sulfonic acid (Stepan Company, Northfield, USA).

The anionic surfactant of one or more embodiments may contain one or more oil components. In some embodiments, the oil components may be mineral oil. The anionic surfactant of one or more embodiments may contain the oil component in an amount in the range of about 1 to 20 wt. %. For example, the anionic surfactant may contain the oil components in an amount ranging from a lower limit of any of 1, 2, 5, and 10 wt. % to an upper limit of any of 5, 10, 15, and 20 wt. %, where any lower limit can be used in combination with any mathematically-compatible upper limit.

The zwitterionic co-surfactants of one or more embodiments may possess no readily hydrolysable chemical bonds. In one or more embodiments, the zwitterionic co-surfactant may be one or more of the group consisting of sultaine surfactants, such as cocamidopropyl hydroxysultaine, and betaine surfactants, such as SURFATEX CBS™, (Surfactants International, LLC, NJ, USA); PETROSTEP® SB, PETROSTEP® CG-50, Amphosol® CG-50, (Stepan, IL, USA); and Cola® Teric CBS-HP (Colonial Chemical Inc., TN, USA; hereinafter "CBS").

The zwitterionic co-surfactant of one or more embodiments may be selected to provide one or more of stability at high salinity and/or high temperature, a substantial reduction in hydrocarbon-seawater interfacial tension, and an ability to form an emulsion very rapidly upon contact with the hydrocarbons to be extracted.

The composition of one or more embodiments may contain an anionic surfactant and a zwitterionic co-surfactant in differing amounts or in identical amounts. In one or more embodiments, the composition may contain an anionic surfactant and a zwitterionic co-surfactant in relative amounts such that a weight ratio of the anionic surfactant to the zwitterionic co-surfactant is in the range of 0.3 to 3.0. For example, the composition may contain the anionic surfactant and the zwitterionic co-surfactant in relative amounts such that a weight ratio of the sulfonate surfactant to the zwitterionic co-surfactant is in a range having a lower limit of any of 0.3, 0.4, 0.5, 0.6, 0.7, and 0.8, and an upper limit of any of 0.7, 0.75, 0.8, 0.9, 1.0, 1.2, 1.5, 2.0, 2.5, and 3.0, where any lower limit can be used in combination with any mathematically-compatible upper limit. In particular embodiments the composition may contain the anionic surfactant and the zwitterionic co-surfactant in relative amounts such that a weight ratio of the anionic surfactant to the zwitterionic co-surfactant is in the range of 0.5 to 1.0.

The composition may contain an oil, such as mineral oil. Generally, the anionic surfactant will provide a sufficient amount of oil. However, in some embodiments, external oil may be added to the composition, if needed. In some embodiments, the composition may contain an oil in an amount in the range of 0.002 to 0.02 wt. % based on the total weight of the MCNC suspension. For example, the compositions may contain an oil in an amount in a range having a lower limit of any of 0.002, 0.005, 0.007, 0.01, and 0.12 wt. % and an upper limit of any of 0.007, 0.01, 0.012, 0.015, 0.017, and 0.02 wt. %, where any lower limit can be used in combination with any mathematically-compatible upper limit.

MCNC compositions in accordance with the present disclosure may include an appropriate ratio of the porous particle to the oil phase. In one or more embodiments, the weight ratio of porous particles having cationic surfactant in the pores to oil phase (also including the anionic surfactant) may be about 1:10, 1:12, 1:13, 1:14, 1:15, 1:17, or 1:20. In particular embodiments, the weight ratio of porous particles having cationic surfactant in the pores to oil phase (also including the anionic surfactant) may be about 1:14.

As noted previously, the MCNC compositions disclosed herein include an aqueous phase in which the MCNCs are suspended. The aqueous fluid may be water that has a total dissolved solids (TDS) concentration of 30,000 ppm or more, 50,000 ppm or more, 100,000 ppm or more, or 120,000 ppm or more. In some embodiments, the aqueous fluid may be seawater or brine, and in particular, a high salinity brine. Salts that may be found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In particular embodiments, brine may include an alkali metal halide or carboxylate salt and/or alkaline earth metal carboxylate salts. In one or more embodiments, the composition may contain the aqueous fluid in an amount such that the composition contains the cationic, anionic and zwitterionic surfactants is in a desired concentration for a given application.

The MCNC compositions of one or more embodiments of the present disclosure may be thermally stable, even in the presence of a brine or seawater, at temperatures in the range of 75 to 150° C. for a duration of 3 days or more, 5 days or more, 10 days or more, 20 days or more, 30 days or more, 45 days or more, or 60 days or more. As used herein "thermally stable" means the composition does not chemically or physically degrade (such as decomposition or precipitation). In some embodiments, the MCNC compositions of one or more embodiments of the present disclosure may be thermally stable, even in the presence of a brine or seawater, at temperatures in the range of 75 to 150° C. for a duration in a range having a lower limit of 3 days or more, 5 days or more, 10 days or more, 20 days or more, 30 days or more, 45 days or more, or 60 days or more and an upper limit of 60 days or less, 90 days or less, 180 days or less, 1 year or less, or 2 years or less. The MCNC compositions may, for instance, be thermally stable for the above durations at temperatures in a range having a lower limit of any of 75, 90, 100, 110, and 120° C., and an upper limit of any of 90, 100, 120, and 150° C., where any lower limit can be used in combination with any mathematically-compatible upper limit.

The MCNC compositions of one or more embodiments of the present disclosure may have a mean IFT value with crude oil of 0.08 mN/m or less. In some embodiments, the MCNC compositions may have a mean IFT value with crude oil of 0.06 mN/m or less, 0.04 mN/m or less, or 0.02 mN/m or less. The IFT between crude oil and a MCNC compositions may be measured using a spinning drop interfacial tensiometer (SDT, KRUSS, Germany). The solution to be tested may be added to a capillary tube and a drop of filtered crude oil added. The mixture may be spun at about 4000 revolutions per minute (rpm) at 90° C. The diameter of the oil droplet may be recorded every 5 minutes for around 30 minutes and used to calculate the IFT based on the density difference between the phases, temperature, speed, and the drop diameter. The IFT is calculated in accordance with the Young-Laplace model Method of Making MCNC Composition MCNC compositions in accordance with one or more embodiments may be made according to the method shown in FIG. 2. The method 200 includes providing an aqueous suspension of porous core particles 202, the porous core particles encapsulating a cationic surfactant. The porous core particles encapsulating a cationic surfactant may be synthesized or purchased commercially. In embodiments in which the porous core particles are synthesized, known methods for making mesoporous silica, for example, may be used.

In one or more embodiments, the method 200 may then include adding an oil phase that includes an anionic surfactant 204 to create a mixture. The oil phase including an anionic surfactant is as previously described.

The mixture may then be agitated 206 in order to provide a homogeneous mixture. The agitation may include techniques such as sonication and stirring. The mixture should be agitated until a visually homogeneous mixture is obtained, meaning no precipitation or phase separation is observed. Then, an aqueous phase including a zwitterionic surfactant may be added 208 to form the MCNC composition. The mixture may again be agitated, such as by sonication, after the aqueous phase including a zwitterionic surfactant is added. Optionally, an additional aqueous fluid, which may be seawater or a brine solution, may be further added to form a composition for use in enhanced oil recovery applications. The additional aqueous phase may be a high salinity brine having a total dissolved solids content as previously described for the aqueous phase of the MCNC composition.

Method of Using MCNC Compositions for EOR Applications

The MCNC compositions of one or more embodiments may be used for treating a hydrocarbon-bearing formation in EOR operations (see FIG. 3). In some embodiments, a MCNC composition may be injected into the hydrocarbon-bearing formation at an injection well, driven through the mobile zone of the formation, displacing hydrocarbons and increasing the hydrocarbon-saturation of the oil bank. In one or more embodiments the hydrocarbons may be recovered at a production well. In some embodiments, the recovered hydrocarbons may contain at least a portion of the MCNC composition.

In enhanced oil recovery applications, the MCNC compositions disclosed herein may be exceptionally stable under reservoir conditions, which may lead to improved oil recovery. Additionally, due to the unique encapsulation of the cationic surfactant inside the porous particle, which is further encapsulated by the oil phase, the cationic surfactant may be slowly released into the hydrocarbon-bearing formation during enhanced oil recovery operations. This encapsulation strategy may be advantageous as compared to conventional methods of introducing surfactants into a hydrocarbon-bearing formation. In conventional methods, much of the surfactant may adsorb onto surfaces near the wellbore area leading to less surfactant penetrating deeper into the formation where enhanced oil recovery is needed.

EXAMPLES

Materials

CTAB, tetraethylorthosilicate (TEOS), sodium hydroxide (NaOH), sodium chloride (NaCl), calcium chloride dihydrate ($CaCl_2.2H_2O$), magnesium chloride hexahydrate ($MgCl_2.6H_2O$), sodium sulfate ($Na_2SO_4$), and sodium bicarbonate ($NaHCO_3$) were purchased from Sigma Aldrich and used as received without further purification. Petronate HL/L (Petronate) with 61 wt % of PS active ingredients, 35 wt % mineral oil (Mo.), and 4 wt % deionized (DI) water was obtained from Sonneborn LLC (Parsippany, USA) and used as received. ColaTeric CBS (CBS) with 48 wt % active ingredients from Colonial Chemical (South Pittsburg, USA) was used as received. The crude oil (density 0.817 g/cm3) was composed of 33.1% saturates, 47.3% aromatics, 8.7% resins (polars I), and 10.9% asphaltenes (polars II) according to a SARA (saturate, aromatic, resin, and asphaltene) analysis. All other chemicals were obtained from Fisher Scientific (Fair Lawn, USA).

Methods

The interfacial tension between crude oil and each of the HNS samples was measured using a spinning drop IFT (SDT, KRUSS, Germany). The IFT measurements were conducted using crude oil at 25° C. The shape of the oil droplet was fitted to the model and the IFT was calculated using the instrument software. All samples were incubated in an oven at 90° C. before measuring the IFT. The IFT was measured in days.

Stability of the samples was evaluated by aging the samples in brine at 90° C. and visually evaluating the samples for signs of precipitation and/or phase separation.

Chemical makeup of the samples was analyzed using Fourier Transform Infra-Red (FTIR) measurements. Functional groups were determined utilizing a Nicolete 6700 IR spectrophotometer at atmospheric conditions. Prior to each measurement, a background signal was collected and it was then subtracted from the sample of interest. Because the MCNC is suspended in high salinity water and cannot be separated by centrifugation, the sample was evaporated at 90° C. and the resultant powder sample was analyzed. To differentiate the signals produced from the high salinity water (HSW), HSW was evaporated and the resultant white crystals were analyzed.

The hydrodynamic size of the MCNC was determined by dynamic light scattering (DLS) utilizing a Zetasizer Nano ZS90 by Malvern. Quartz glass cuvettes were utilized for determining hydrodynamic diameter. The samples were allowed to equilibrate for 30 seconds and the measurements were conducted at 25° C. The average of three measurements is reported.

Example 1

Synthesis of Porous Silicon Nanoparticles containing CTAB 1 gram of CTAB was dissolved in 480 mL of DI water. The mixture was stirred until all the CTAB dissolved. A NaOH solution (2 M) was prepared in DI water, and 3.5 mL was added to the beaker containing CTAB and water, followed by adjusting the temperature to 80° C. Then, 5 mL of tetraethylorthosilicate was added dropwise while maintaining vigorous stirring of the solution. The mixture was stirred for 2 hours. The white precipitate was filtered with 0.2 um filter paper under vacuum. The white powder was washed 4 times with an ample amount of DI water to remove the excess surfactant. It was then dried in vacuum oven at 60° C. for 1 day. Thermal gravimetric analysis of the sample confirmed that about 40 wt. % of the final product was CTAB.

Method of Making a MCNC Suspension

The porous silica particles encapsulating CTAB were suspended in DI water using ultrasonication in an ice bath such that a concentration of 6.88 mg/mL of porous silica particles encapsulating CTAB was obtained. 0.81 g of Petronate HL/L anionic surfactant was added to 9.19 ml of the MCM-41 suspension. This was mixed by sonication until the mixture was homogenous. 1.3 ml of the resultant sample was mixed with 2.2 ml of a 4 wt. % solution of Cola® Teric CBS (the Cola® Teric CBS was diluted from 48 wt. % to 4 wt. % prior to use). The solution was then added to high salinity water.

Comparative Example 1

A comparative sample was made using the procedure described in Example 1, however, no porous silica particles having CTAB were included. Therefore, the first step in the procedure was adding the Petronate HL/L to DI water. The rest of the steps were as described in Example 1.

FTIR Analysis

FIGS. 4A-4D show FTIR data for porous silicon particles including CTAB (FIG. 4A), the composition described in Example 1 (FIG. 4B), the composition described in Comparative Example 1 (FIG. 4C), and evaporated high salinity water (FIG. 4D). As shown, the inventive sample (FIG. 4B) includes all of the functional groups of the porous silica, the comparative example and the high salinity water.

Stability Studies

A comparative example was prepared by adding the previously described porous silica with CTAB in the pores to high salinity water in order to obtain a concentration of 0.11 mg/mL. The inventive sample was prepared according to Example 1.

FIGS. 5A and 5B are photos showing the stability of a comparative sample (FIG. 5A) and the inventive example made according to Example 1 (FIG. 5B). The comparative example shown in FIG. 5B is a suspension of porous silica particles, but it does not include the oil phase, anionic surfactant or zwitterionic surfactant. FIG. 5B shows sedimentation and precipitation of the porous silica particles after only one hour at 90° C. In contrast, the inventive sample was stable (meaning no visible precipitation) for at least 31 days at 90° C.

DLS Analysis

FIG. 6 shows DLS particle size data for the inventive composition. The particle size data, which shows a general correspondence between Z-average and hydrodynamic diameter, indicate that the particles do not aggregate over time. Furthermore, the slow increase in hydrodynamic diameter indicates that the porous silica core particles are slowly being released from the encapsulating shell.

IFT Analysis

Figure 7:
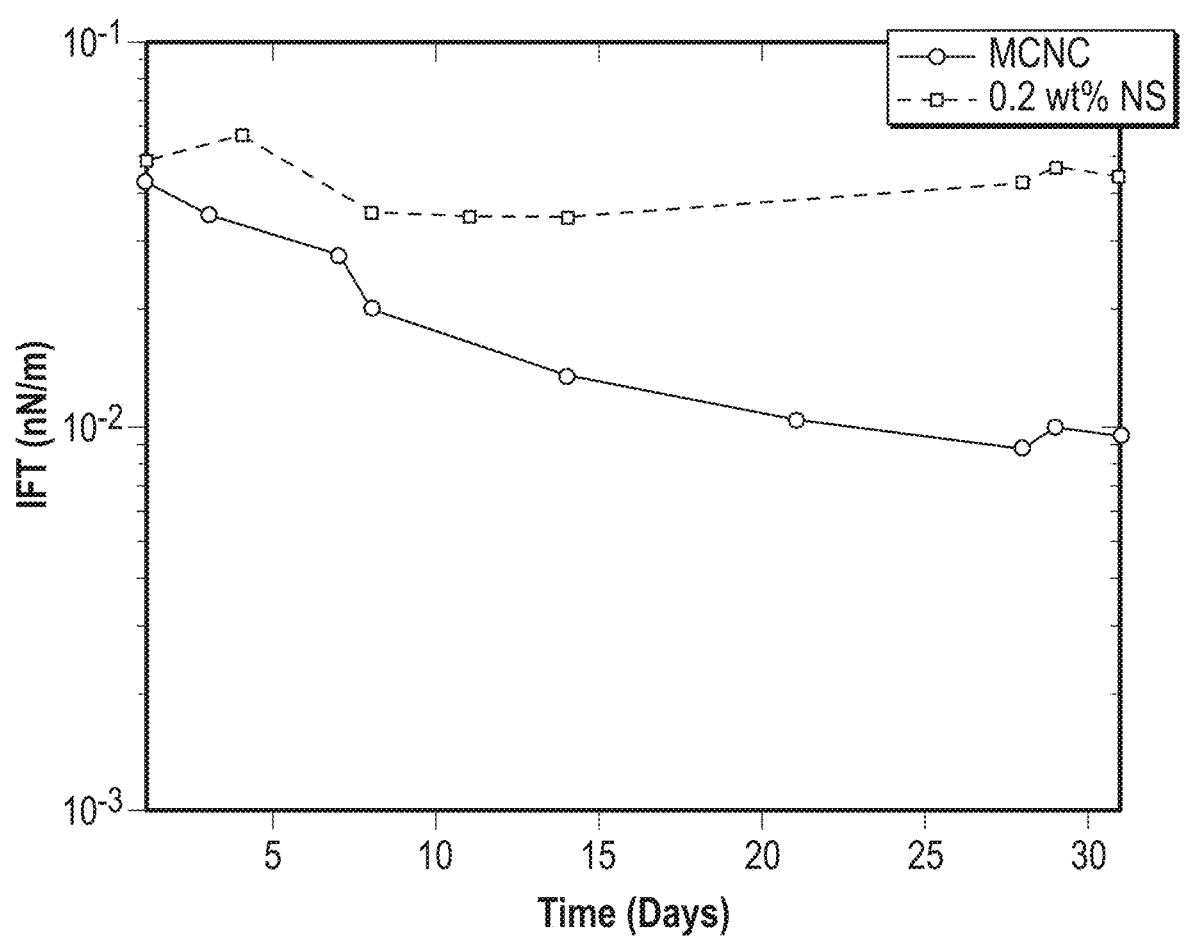
FIG. 7 is a plot showing the interfacial tension data of a composition in accordance with one or more embodiments.

Interfacial tension (IFT) data for the inventive sample made according to Example 1 and the comparative samples made according to Comparative Example 1 are shown in FIG. 7. The IFT of the inventive sample continued to decrease over 30 days whereas the IFT of control remained constant. This indicates that, over time, more surfactant is released from the porous silica particles, which ensures continued decrease in the IFT. This results a in lower capillary number and improved oil displacement. Thus, the decrease in IFT may prove advantageous for EOR applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A multicomponent nanocapsule composition comprising: a core particle comprising a cationic surfactant encapsulated in a porous particle, wherein the porous particle includes an amount, higher than 10 wt. % up to 50 wt. % of the cationic surfactant in its pores based upon the total weight of the porous particle and the cationic surfactant; an oil phase encapsulating the core particle, wherein the oil phase comprises an anionic surfactant and a zwitterionic surfactant; and an aqueous phase in which the encapsulated core particle is suspended.

2. The multicomponent nanocapsule composition of claim 1, wherein the porous particle is porous silica.

3. The multicomponent nanocapsule composition of claim 2, wherein the porous silica has an average hydrodynamic diameter of from 50 to 300 nm.

4. The multicomponent nanocapsule composition of claim 1, wherein the cationic surfactant is an alkyl ammonium salt.

5. The multicomponent nanocapsule composition of claim 4, wherein the alkyl ammonium salt is cetyl trimethyl ammonium bromide.

6. The multicomponent nanocapsule composition of claim 1, wherein the oil phase comprises mineral oil.

7. The multicomponent nanocapsule composition of claim 1, wherein the anionic surfactant is a petroleum sulfonate surfactant.

8. The multicomponent nanocapsule composition of claim 1, wherein the zwitterionic surfactant is selected from the group consisting of sultaine surfactants, betaine surfactants, and combinations thereof.

9. The multicomponent nanocapsule composition of claim 1, wherein the aqueous phase is a seawater or brine.

10. The multicomponent nanocapsule composition of claim 1, wherein the porous particle includes between 20 wt % and 50 wt % of the cationic surfactant in its pores based upon the total weight of the porous particle and the cationic surfactant.

* * * * *